(12) United States Patent
Paredes et al.

(10) Patent No.: US 6,601,180 B1
(45) Date of Patent: Jul. 29, 2003

(54) METHOD AND SYSTEM FOR PROVIDING LINK DETECTION TO A PC CARD FOR POWER MANAGEMENT

(75) Inventors: Vladimir Paredes, San Jose, CA (US); Lomberto Jimenez, Hollister, CA (US); Vu Thanh, San Jose, CA (US)

(73) Assignee: 3Com Corporation, Santa Clara, CA (US)

( * ) Notice: Subject to any disclaimer, the term of this patent is extended or adjusted under 35 U.S.C. 154(b) by 0 days.

(21) Appl. No.: 09/549,873

(22) Filed: Apr. 14, 2000

(51) Int. Cl.$^7$ ................................................. G06F 1/32
(52) U.S. Cl. ........................................................ 713/323
(58) Field of Search .......................... 713/320, 322–324

(56) References Cited

U.S. PATENT DOCUMENTS

| | | | | |
|---|---|---|---|---|
| 5,483,464 A | * | 1/1996 | Song ............................. | 713/300 |
| 5,617,572 A | * | 4/1997 | Pearce et al. ................. | 713/323 |
| 5,721,935 A | * | 2/1998 | DeSchepper et al. ........ | 713/323 |
| 5,958,059 A | * | 9/1999 | Oishi ............................ | 713/323 |
| 6,357,013 B1 | * | 3/2002 | Kelly et al. ................... | 713/324 |

* cited by examiner

Primary Examiner—Thomas M. Heckler
(74) Attorney, Agent, or Firm—Wagner, Murabito, & Hao LLP

(57) ABSTRACT

A method and system for providing link detection to a PC Card for power management. Specifically, one embodiment of the present invention includes a method for reducing power consumption by a peripheral component coupled to a host computer. For instance, the method includes the step of detecting whether a peripheral component is coupled to an active communication link. The method also includes the step of determining whether a circuit of the peripheral component is within a first power consuming mode (e.g., high power consuming mode). Provided the peripheral component is not coupled to the active communication link and the circuit of the peripheral component is within the first power consuming mode, the method includes the step of causing the circuit to enter a second power consuming mode (e.g., a sleep mode). Furthermore, provided the peripheral component is coupled to the active communication link and the circuit of the peripheral component is not within the first power consuming mode, the method includes the step of causing the circuit to enter the first power consuming mode (e.g., high power consuming mode).

24 Claims, 11 Drawing Sheets

METHOD AND SYSTEM FOR PROVIDING LINK DETECTION TO A PC CARD FOR POWER MANAGEMENT

TECHNICAL FIELD

The present invention generally relates to the field of computer networking. More particularly, the present invention relates to the field of communication expansion boards and cards.

BACKGROUND ART

Computers are useful functional devices which are fabricated in a variety of sizes ranging from computers which occupy large office space down to computers which are held in one's hand. These varying sizes of computers also perform an extremely wide variety of useful operations, depending on the software which is installed within their particular memory storage device. For instance, computers have become an integral tool used in a wide variety of different applications, such as in finance and commercial transactions, computer-aided design and manufacturing, health care, telecommunication, education, etc. Additionally, computers are finding new applications as a result of advances in hardware technology and rapid development in software technology. Furthermore, a computer system's functionality is dramatically enhanced by coupling stand-alone computers together to form a computer network. In a computer network, users may readily exchange files, share information stored on a common database, pool resources, and communicate via electronic mail (e-mail) and via video teleconferencing.

A computer system may be coupled to several different types of computer networks. For example, one popular type of computer network is known as a local area network (LAN). LANs connect multiple computer systems together such that the users of the computer systems can access the same information and share data. Typically, in order to be connected to a LAN, a general purpose computer system utilizes a communication expansion board or card designed for such a purpose. There are several different communication expansion boards and cards which can be utilized to connect a computer system to a LAN. For example, a network interface card (NIC), a PC Card conforming to the Personal Computer Memory Card International Association (PCMCIA) specification, or the like, can be used to connect a computer system to a LAN. Essentially, these types of communication expansion boards and cards work with the operating system and central processing unit (CPU) of the host computer system in order to control the flow of information over the LAN. Some types of communication expansion boards and cards are used to connect a computer system to a wide area network (WAN), the Internet, a digital subscriber line (DSL), an integrated services digital network (ISDN), and the like.

It is appreciated that portable laptop computers also typically utilize these types of communication expansion boards and cards in order to connect to different types of computer networks. Since keeping size and weight to a minimum are important factors when dealing with portable laptop computers, some communication expansion boards and cards are fabricated small and light weight. For example, one type of mall and light weight communication card is a PC Card (Type II) which is 5 millimeters thick and approximately the size of a credit card. The PC Card plugs into a PCMCIA slot of a portable laptop computer.

Furthermore, the PC Card is typically designed and manufactured to connect the portable laptop computer to a particular computer network. As such, the PC Card is implemented with a communication plug-in slot or jack corresponding to the particular computer network the portable laptop computer is going to be connected to. In other words, different types of PC Cards are implemented with different types of communication plug-in slots. For example, a LAN PC Card may be implemented with a RJ-45 jack while a modem PC Card may be implemented with a RJ-11 jack.

Since portable laptop computers implemented with communication expansion boards or cards (e.g., PC Cards) are often battery powered, it is very important to prolong (not reduce) the life of their batteries as much as possible. Therefore, even though a communication expansion board or card provides additional functional advantages when implemented with a portable laptop computer, there are also disadvantages associated with this type of system. One of the disadvantages associated with this type of system is that the communication expansion board or card increases the battery power drain of the portable laptop computer. For example, while the portable laptop computer is in its normal operating mode, the communication expansion board or card usually continues to drain battery power even though it is not connected to an active communication link.

DISCLOSURE OF THE INVENTION

Accordingly, a need exists for a method and system for reducing power usage of a communication expansion board or card (e.g., PC Card) thereby prolonging the battery life of a portable laptop computer. The present invention provides a method and system which accomplish the above mentioned need.

Specifically, one embodiment of the present invention includes a method for reducing power consumption by a peripheral component coupled to a host computer. For instance, the method includes the step of detecting whether a peripheral component is coupled to an active communication link. The method also includes the step of determining whether a circuit of the peripheral component is within a first power consuming mode (e.g., high power consuming mode). Provided the peripheral component is not coupled to the active communication link and the circuit of the peripheral component is within the first power consuming mode, the method includes the step of causing the circuit to enter a second power consuming mode (e.g., a sleep mode).

In still another embodiment, the present invention includes a system for reducing power consumption by a peripheral component coupled to a host computer. The system includes a detector circuit coupled to a peripheral component. The detector circuit is adapted to detect whether the peripheral component is coupled to an active communication link. Furthermore, the detector circuit is adapted to generate a first signal in response to the peripheral component not being coupled to the active communication link. The system also includes a control circuit coupled to receive the first signal from the detector circuit. The control circuit is adapted to determine whether a circuit of the peripheral component is within a first power consuming mode (e.g., high power consuming mode). In response to receiving the first signal and the circuit of the peripheral component being within the first power consuming mode, the control circuit is adapted to cause the circuit to enter a second power mode (e.g., low power consuming mode).

In yet another embodiment, the present invention includes a method for reducing power consumption by a peripheral component coupled to a host computer. The method includes the step of detecting whether a peripheral component is coupled to an active communication link. The peripheral component is coupled to the host computer. The method also includes the step of determining whether a circuit of the peripheral component is within a first power consuming mode (e.g., low power consuming mode). Provided the peripheral component is coupled to the active communication link and the circuit of the peripheral component is within a first power consuming mode, causing the circuit to enter a second power consuming mode (e.g., high power consuming mode).

These and other advantages of the present invention will no doubt become obvious to those of ordinary skill in the art after having read the following detailed description of the preferred embodiments which are illustrated in the drawing figures.

BRIEF DESCRIPTION OF THE DRAWINGS

The accompanying drawings, which are incorporated in and form a part of this specification, illustrate embodiments of the invention and, together with the description, serve to explain the principles of the invention.

BEST MODE FOR CARRYING OUT THE INVENTION

Figure 1:
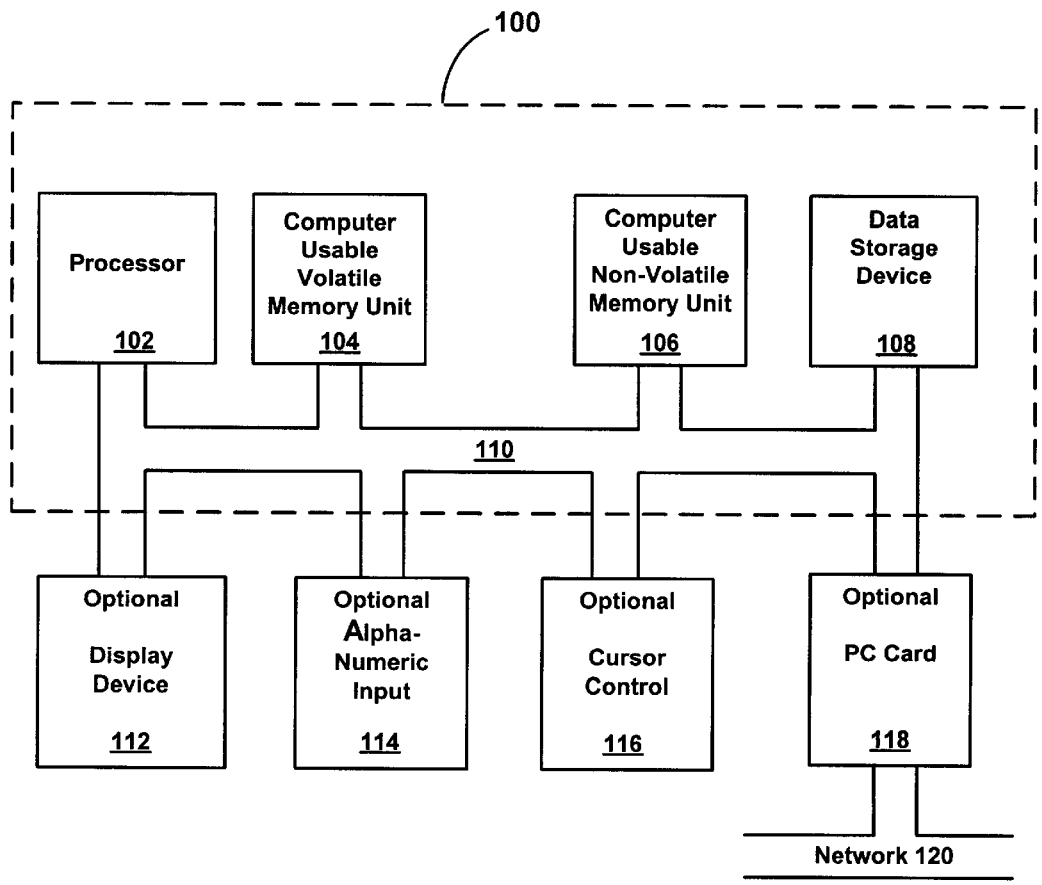
FIG. 1 is a block diagram of an exemplary computer system used in accordance with one embodiment of the present invention.

Reference will now be made in detail to the preferred embodiments of the invention, examples of which are illustrated in the accompanying drawings. While the invention will be described in conjunction with the preferred embodiments, it will be understood that they are not intended to limit the invention to these embodiments. On the contrary, the invention is intended to cover alternatives, modifications and equivalents, which may be included within the spirit and scope of the invention as defined by the appended claims. Furthermore, in the following detailed description of the present invention, numerous specific details are set forth in order to provide a thorough understanding of the present invention. However, it will be obvious to one of ordinary skill in the art that the present invention may be practiced without these specific details. In other instances, well known methods, procedures, components, and circuits have not been described in detail as not to unnecessarily obscure aspects of the present invention.

Some portions of the detailed descriptions which follow are presented in terms of procedures, logic blocks, processing, and other symbolic representations of operations on data bits within a computer or digital system memory. These descriptions and representations are the means used by those skilled in the data processing arts to most effectively convey the substance of their work to others skilled in the art. A procedure, logic block, process, etc., is herein, and generally, conceived to be a self-consistent sequence of steps or instructions leading to a desired result. The steps are those requiring physical manipulations of physical quantities. Usually, though not necessarily, these physical manipulations take the form of electrical or magnetic signals capable of being stored, transferred, combined, compared, and otherwise manipulated in a computer system. For reasons of convenience, and with reference to common usage, these signals are referred to as bits, values, elements, symbols, characters, terms, numbers, or the like with reference to the present invention.

It should be borne in mind, however, that all of these terms are to be interpreted as referencing physical manipulations and quantities and are merely convenient labels and are to be interpreted further in view of terms commonly used in the art. Unless specifically stated otherwise as apparent from the following discussions, it is understood that throughout discussions of the present invention, discussions utilizing terms such as "detecting" or "causing" or "receiving" or "recognizing" or "determining" or "generating" or "transmitting" or the like, refer to the action and processes of a computer system, or similar electronic computing device, that manipulates and transforms data. The data is represented as physical (electronic) quantities within the computer system's registers and memories and is transformed into other data similarly represented as physical quantities within the computer system memories or registers or other such information storage, transmission, or display devices.

In the following description of embodiments of the present invention, a PC Card conforming to the Personal Computer Memory Card International Association (PCMCIA) specification is a peripheral component. Although some of the present embodiments specifically recite a PC Card, the present invention is also well suited to an embodiment employing various other peripheral components. That is, the present invention is well suited to an embodiment in which the peripheral component is, for example, a network interface card (NIC). Similarly, the present invention is well suited to an embodiment in which the peripheral component is, for example, a compact form factor I/O (input/output) card. Additionally, the present invention is well suited to use in an embodiment in which the peripheral component is, for example, a rate controller, a small computer system interface (SCSI) controller, a graphics card, and the like. Furthermore, the present invention is well suited to be used, for example, in a non-peripheral component environment such as an Application Specific Integrated Circuit (ASIC) disposed on a motherboard, an embedded circuit, and the like.

With reference now to FIG. 1, portions of the present method and system can reside, for example, in a computer system. FIG. 1 illustrates an exemplary computer system 100 used to conjunction with the present invention. It is appreciated that system 100 of FIG. 1 is only exemplary and that the present invention can operate within a number of different computer systems including general purpose networked computer systems, embedded computer systems, stand alone computer systems, and the like. Furthermore, the present invention can also operate within a number of different electronic devices.

System 100 of FIG. 1 includes an address/data bus 110 for communicating information, and a central processor unit(s) 102 coupled to bus 110 for processing information and instructions. Central processor(s) 102 may be a microprocessor or any other type of processor. System 100 also includes data storage features such as a computer usable volatile memory unit 104 (e.g., random access memory, static RAM, dynamic RAM, etc.) coupled to bus 110 for storing information and instructions for central processor(s) 102, computer usable non-volatile memory unit 106 (e.g., read only memory, programmable ROM, flash memory, EPROM, EEPROM, etc.) coupled to bus 110 for storing static information and instructions for the central processor (s) 102, and a mass data storage device 108 (e.g., a magnetic or optical disk and disk drive) coupled to bus 110 for storing information and instructions. System 100 of the present invention also includes an optional alphanumeric input device 114, which includes alphanumeric and function keys, which is coupled to bus 110 for communicating information and command selections to central processor(s) 102. System 100 also optionally includes a cursor control device 116 coupled to bus 110 for communicating user input information and command selections to central processor(s) 102. System 100 of the present embodiment also includes an optional display device 112 coupled to bus 110 for displaying information.

Referring still to FIG. 1, optional display device 112 may be a liquid crystal device, cathode ray tube, or other display device suitable for creating graphic images and alphanumeric characters recognizable to a user. Optional cursor control device 116 allows the computer user to dynamically signal the two dimensional movement of a visible symbol (e.g., cursor) on a display screen of display device 112. Many implementations of cursor control device 116 are known in the art including a mouse, track ball, touch pad, joystick or special keys on alphanumeric input device 114 capable of signaling movement of a given direction or manner of displacement. Alternatively, it is appreciated that a cursor can be directed and/or activated via input from alphanumeric input device 114 using special keys and key sequence commands. The present invention is also well suited to directing a cursor by other means such as, for example, voice commands.

With reference still to FIG. 1, a PC Card (e.g., Type 11) 118 in accordance with one embodiment of the present invention coupled to bus 110 is connected to a network 120 and controls the flow of information of computer system 100 over network 120. Specifically, data packets (for example) which are incoming and outgoing via network 120 are transmitted and received by PC Card 118. Furthermore, within the present embodiment, an X-jack module (not shown) may be implemented as part of PC Card 118.

Figure 2A:
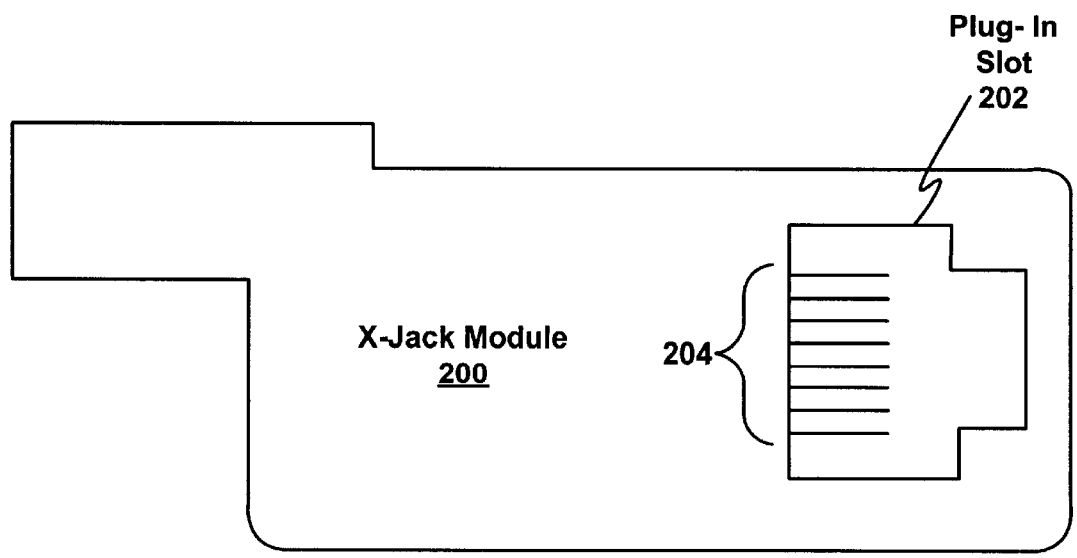
FIG. 2A is a diagram of a top view of an X-jack module having a communication plug-in slot.

With reference now to FIG. 2A, which is a diagram of a top view of an X-jack module 200 which can be used in accordance with the present invention. The X-jack module 200 is typically utilized in conjunction with a communication expansion card or board in order to physically connect a computer system to some type of computer network. Specifically, X-jack module 200 is a low profile module (e.g., 5 mm thick) fabricated of a plastic material which includes a communication plug-in slot or jack 202 wherein a communication plug-in adapter would fit. It should be appreciated that communication jack 202 is a vertical plug-in jack which is different from the industry standard horizontal plug-in jacks. Communication plug-in slot 202 also includes pins 204 which contact with corresponding pins of a communication plug-in adapter. Furthermore, communication plug-in slot 202 of X-jack module 200 can be implemented to accommodate any type of communication plug-in adapter. For example, communication plug-in jack 202 may be implemented in such a manner to accommodate RJ-45 plug-in adapters, RJ-11 plug-in adapters, digital subscriber line (DSL) plug-in adapters, or the like. It is well known by those of ordinary skill in the communication art that RJ-45 plug-in adapters are commonly used for local area networks (LANs) or other integrated services digital networks (ISDNs) while RJ-11 plug-in adapters are usually used for modems.

Figure 2B:
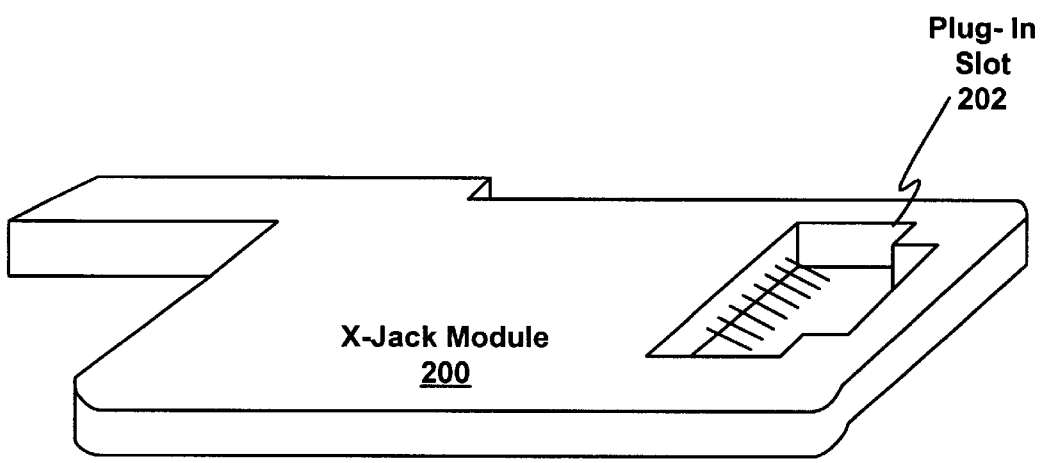
FIG. 2B is a diagram of a perspective view of the X-jack module of FIG. 2A having the communication plug-in slot.

Referring now to FIG. 2B, which is a diagram of a perspective view of X-jack module 200 of FIG. 2A. As shown in FIG. 2B, X-jack module 200 has a consistent thickness (e.g., 5 millimeters) and communication plug-in jack 202 is an open ended cavity which completely passes through X-jack module 200. It should be appreciated that the physical dimensions of X-jack module 200 are about 2 centimeters wide by about 5 centimeters long. It should be understood that X-jack module 200 may be fabricated with different physical dimensions than those mentioned above.

Figure 3:
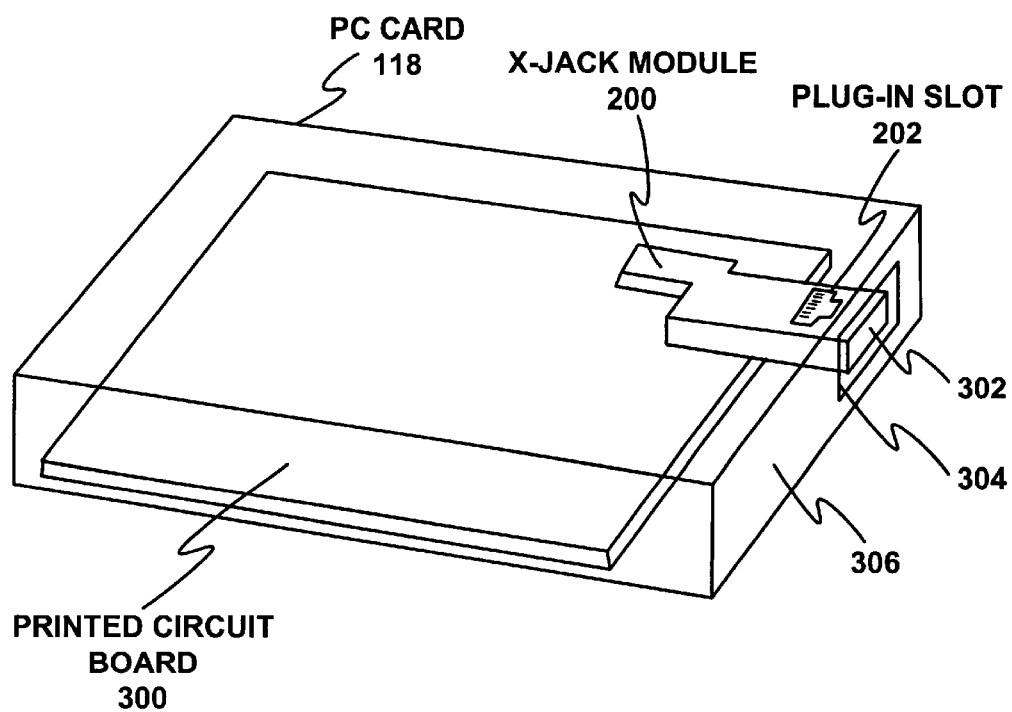
FIG. 3 illustrates the X-jack module of FIGS. 2A and 2B implemented as part of and housed inside a PC Card.

With reference to FIG. 3, which illustrates the X-jack module 200 of FIGS. 2A and 2B implemented as part of and housed inside PC Card 118 of FIG. 1. Specifically, PC Card 118 is a PC Card (e.g., Type II) which conforms to the Personal Computer Memory Card International Association (PCMCIA) specification. additionally, PC Card 118 is about 5 millimeters thick and approximately the size of a credit card. The PC Card 118 is manufactured to plug into a PCMCIA slot of a computer system (e.g., 100). Furthermore, PC Card 118 houses a printed circuit board 300 which is explicitly designed and manufactured to enable a computer system to communicate over a particular type(s) of computer network(s). As such, X-jack module 200 is implemented as part of PC Card 118 of the present embodiment in order to provide it a physical connection port for a communication plug-in adapter of a computer network.

More specifically, X-jack module 200 is housed within a slot mouth 304 which opens on an exposing side 306 of PC Card 118. It should be appreciated that exposing side 306 of PC Card 118 is typically visible when PC Card 118 is inserted into a computer. Therefore, at least one part of X-jack module 200 (an activation surface 302) is usually visible when PC Card 118 is inserted into the computer.

Figure 4A:
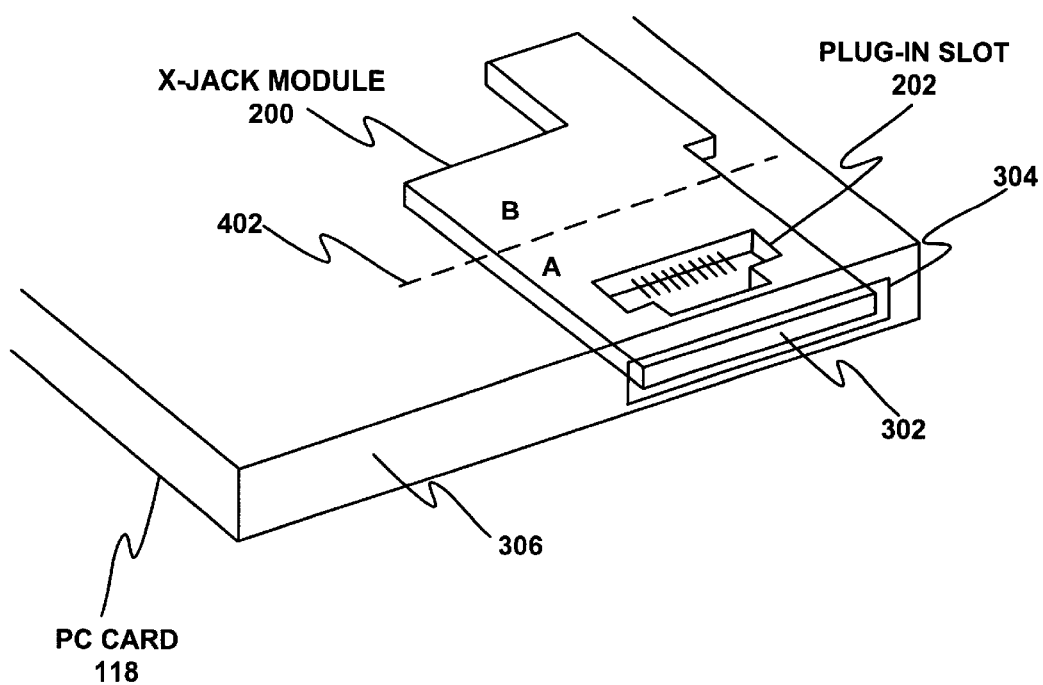
FIG. 4A illustrates one embodiment of the PC Card of FIG. 3 implemented with the X-jack module, wherein the X-jack module is in its retracted position.
Figure 4B:
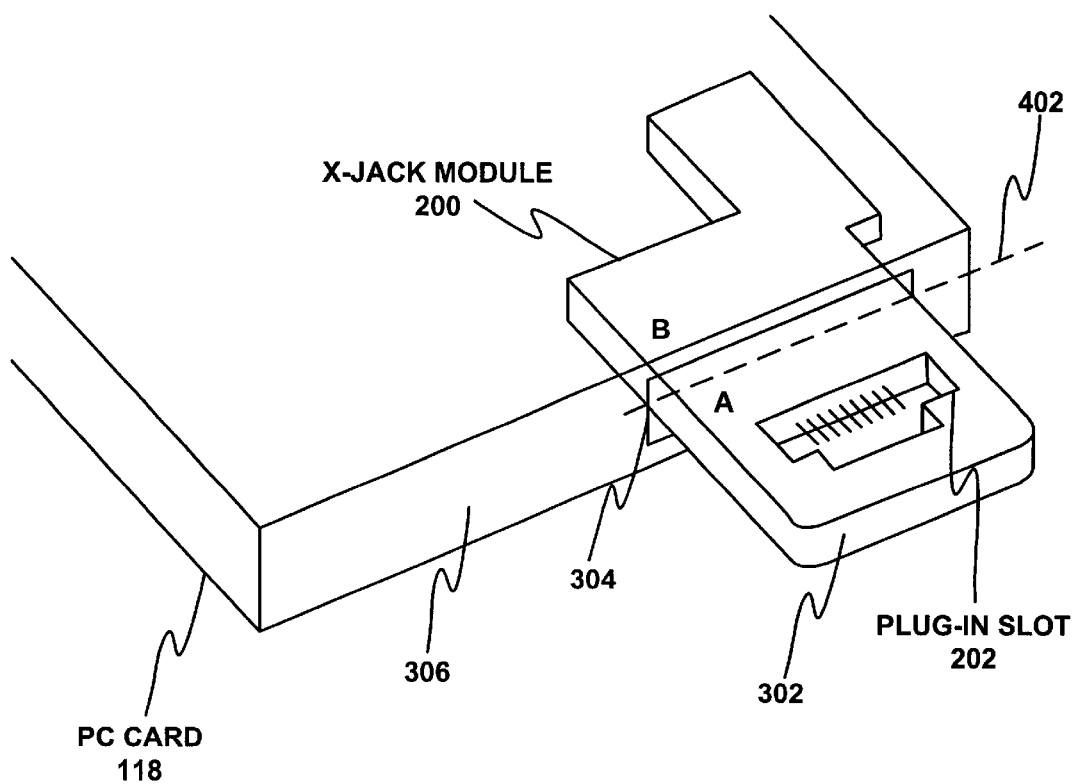
FIG. 4B illustrates one embodiment of the PC Card of FIG. 3 implemented with the X-jack module, wherein the X-jack module is in its protruded position.

Referring to FIGS. 4A and 4B, which illustrate two operable positions of X-jack module 200 which is housed within PC Card 118. In particular, FIG. 4A illustrates X-jack module 200 in its retracted position, while FIG. 4B illustrates X-jack module 200 in its protruded position. As shown in FIGS. 4A and 4B, X-jack module 200 is classified into two portions which are separated by a dotted line 402. That is, the frontal portion of X-jack module 200 is designated as portion A, while the rear portion of X-jack module 200 is designated as portion B. Specifically, portion A refers to the portion of X-jack module 200 containing communication plug-in jack 202. Furthermore, activation surface 302 also constitutes part of portion A. Conversely, portion B refers to the other portion of X-jack module 200 not containing communication plug-in jack 202.

With reference now to FIG. 4A, which illustrates X-jack module 200 in its retracted position. It should be appreciated that except for activation surface 302, both portion A and portion B of X-jack module 200 are concealed within PC Card 118 when X-jack module 200 is in its retracted position. As such, portion A of X-jack module 200 is more accurately described as mostly concealed within PC Card 118. Since portion A is mostly concealed within PC Card 118, communication plug-in jack 202 is also concealed from view.

Referring now to FIG. 4B, which illustrates X-jack module 200 in its protruded position. It should be understood that the protruded position of X-jack module 200 is the alternate operable position of X-jack module 200. In particular, when activation surface 302 of X-jack module 200 is momentarily pressed deeper into slot mouth 304 of PC Card 118, X-jack module 200 is released from its retracted position (as depicted in FIG. 4A) into its protruded position depicted in FIG. 4B. When X-jack module 200 is in its protruded position, portion A protrudes from exposing side 306 of PC Card 118. More precisely, as depicted in FIG. 4B, portion A is exposed in its entirety while portion B is still concealed within PC Card 118. As such, since communication plug-in jack 202 is entirely contained within portion A, communication plug-in jack 202 is physically located outside of slot mouth 304 and thereby outside of PC Card 118.

Typically, when communication plug-in jack 202 is not in use, X-jack module 200 is pressed inward manually to return it to its retracted position as shown in FIG. 4A, wherein activation surface 302 becomes level with a plane formed by exposing side 306. In doing so, X-jack module 200 remains in its retracted position as depicted in FIG. 4A.

Figure 5:
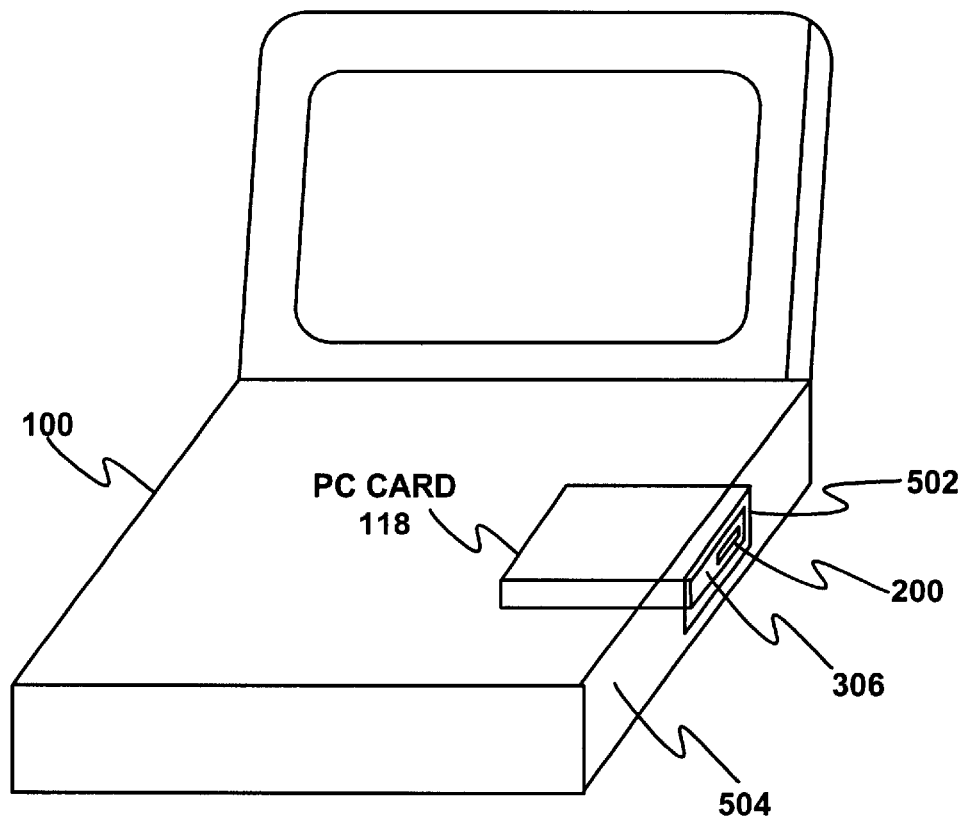
FIG. 5 illustrates the PC Card of FIG. 3 as having been inserted into a computer system.

Referring to FIG. 5, which illustrates PC Card 118 of FIG. 3 as having been inserted into computer system 100 (e.g., laptop computer) of FIG. 1. Generally, PC Cards provide various add-on functions for computer system 100. As such, these PC Cards extend built-in functionality of computer system 100. Within the present embodiment, PC Card 118 is designed explicitly to provide computer network communication capability to computer system 100, thereby avoiding the overhead of having this capability built-in as a permanent part of computer system 100.

Specifically, PC Card 118 is configured to be inserted into a PCMCIA slot 502 (also referred to as a PC Card slot) of computer system 100. In order to receive PC Card 118, computer 100 has PCMCIA slot 502 on side 504 of computer 100. Furthermore, by looking at side 504 of computer system 100, when PC Card 118 has been inserted into PCMCIA slot 502, exposing side 306 of PC Card 118 is still visible. Additionally, part of X-jack module 200 is also visible. When PC Card 118 has been inserted completely into PCMCIA slot 502 as shown, computer system 100 has the ability to be connected to and communicate over a computer network.

Figure 6:
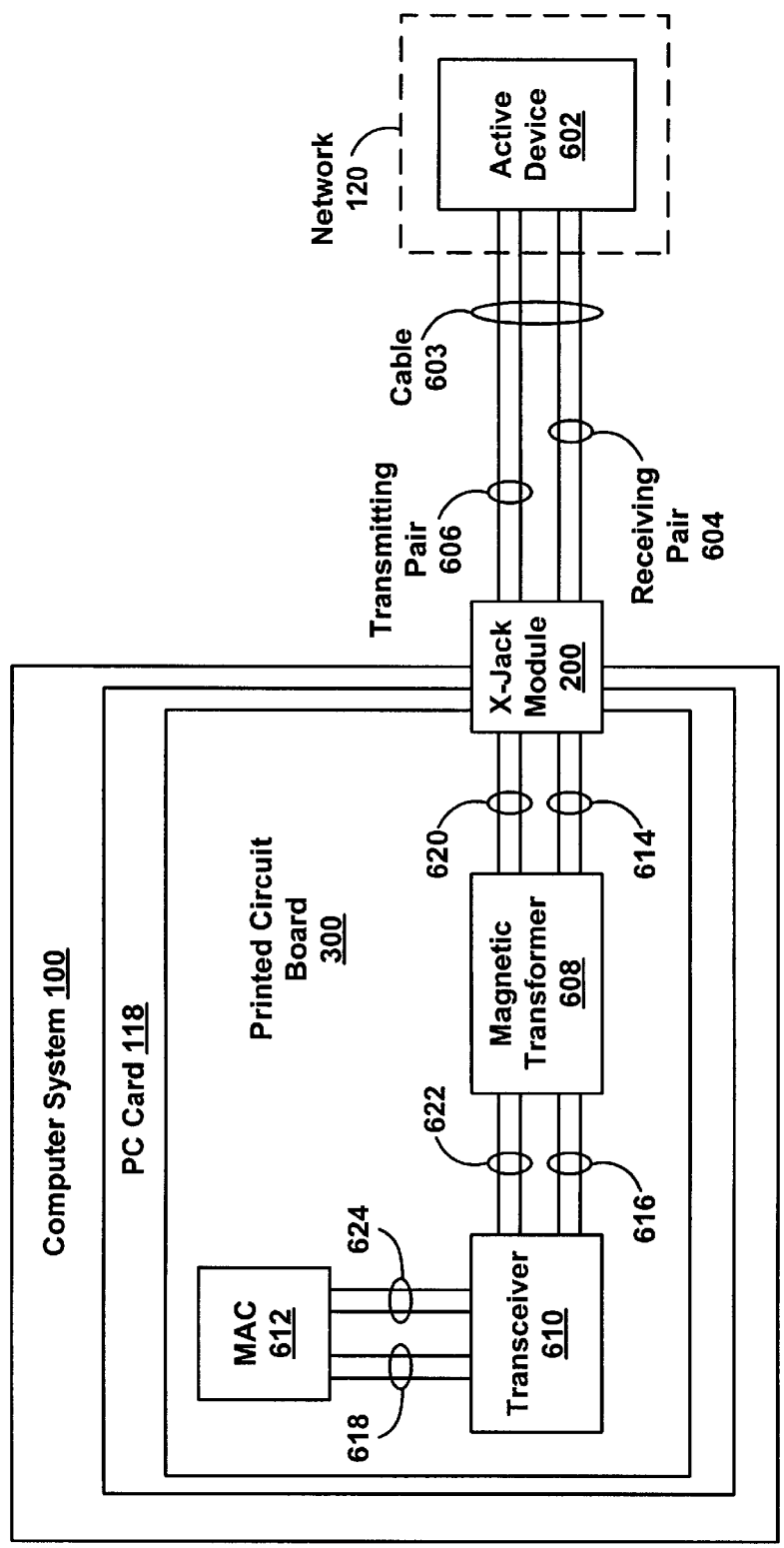
FIG. 6 is a block diagram of the PC Card of FIG. 3 coupled to an active communication link in accordance with one embodiment of the present invention.

With reference now to FIG. 6, which is a block diagram of PC Card 118 of FIG. 3 coupled to an active communication link (e.g., network 120) in accordance with one embodiment of the present invention. The general idea of the present embodiment is to enable computer system 100 and active device 602 to communicate. As such, PC Card 118 has been inserted completely into PCMCIA slot 502 (shown in FIG. 5) of computer system 100. Furthermore, since PC Card 118 is coupled to active device 602, computer system 100 and active device 602 are able to communicate. It is appreciated that active device 602 of the present embodiment is well suited to be any type of electrical device. For example, active device 602 may be a hub, switch, another computer system, and the like.

Specifically, a cable 603 communicatively couples PC Card 118 to active device 602. It is appreciated that cable 603 and active device 602 are part of network 120. Within the present embodiment, cable 603 includes 4 wires. That is, cable 603 includes a transmitting (TX) pair of wires 606 which PC Card 118 utilizes to transmit communication signals to active device 602. Additionally, cable 603 includes a receiving (RX) pair of wires 604 which PC Card 118 utilizes to receive communication signals from active device 602. It is understood that cable 603 is coupled to X-jack module 200, which receives and outputs communication signals for PC Card 118. It should be appreciated that cable 603 of the present embodiment is well suited to include any amount of wires. Moreover, cable 603 is not strictly limited to include wires. Instead, cable 603 of the present embodiment is well suited to include different types of transmission technologies (e.g., fiber optics). Furthermore, the present embodiment is well suited to operate without cable 603. For example, the present embodiment is well suited to utilize different types of wireless communication between PC Card 118 and active device 602.

Referring still to FIG. 6, X-jack module 200 is communicatively coupled to a magnetic transformer 608 within the present embodiment by a receiving pair of wires 614 and a transmitting pair of wires 620. The magnetic transformer 608 is implemented as part of printed circuit board 300 of PC Card 118. One of the main objectives of magnetic transformer 608 is to protect PC Card 118 and computer system 100 from any high voltages received by X-jack module 200 over receiving pair 604 of cable 603. As such, if magnetic transformer 608 receives a high voltage from X-jack module 200, it does not transfer that high voltage into the rest of printed circuit board 300 or into the electronic components and circuitry of computer system 100. Therefore, it is important to include magnetic transformer 608 as one of the components of printed circuit board 300 of PC Card 118.

The magnetic transformer 608 is communicatively coupled to a transceiver circuit 610 by a receiving pair of wires 616 and a transmitting pair of wires 622. The transceiver circuit 610 is also implemented as part of printed circuit board 300. Specifically, transceiver circuit 610 utilizes common circuit components for performing both transmitting and receiving communication functions. It is appreciated that a transceiver circuit is well known by those of ordinary skill in the art. Additionally, transceiver circuit 610 is communicatively coupled to a Medium Access Control (MAC) circuit 612 by a receiving pair of wires 618 and a transmitting pair of wires 624. Generally, MAC circuit 612 of the present embodiment performs framing/deframing of data units, error checking, and arbitration for use of a network (e.g., 120). Furthermore, it should be appreciated that MAC circuit 612 is communicatively coupled to transmit and receive communication signals with other circuitry of printed circuit board 300. Moreover, within the present embodiment printed circuit board 300 is removably coupled to transmit and receive communication signals with computer system 100, as described above. As such, computer system 100 and active device 602 of network 120 are able to communicate.

With reference still to FIG. 6, it should be appreciated that when PC Card 118 is communicatively coupled to active device 602 of network 120, an active communication link is formed. As part of the active communication link, active device 602 intermittently outputs a link pulse (e.g., normal link pulse, fast link pulse, gigabit link pulse) to PC Card 118 over receiving pair 604. Specifically, when X-jack module 200 of PC Card 118 receives any link pulses over receiving pair 604, they are transmitted to magnetic transformer 608 over receiving pair 614. Additionally, magnetic transformer 608 outputs any received link pulses to transceiver circuit 610 over receiving pair 616. Subsequently, transceiver circuit 610 transmits any received link pulses to MAC circuit 612. Therefore, when PC Card 118 is coupled to an active communication link, link pulses are intermittently transmitted over receiving pairs 604, 614, 616, and 618. It is appreciated that link pulses are well known by those of ordinary skill in the art.

Figure 7:
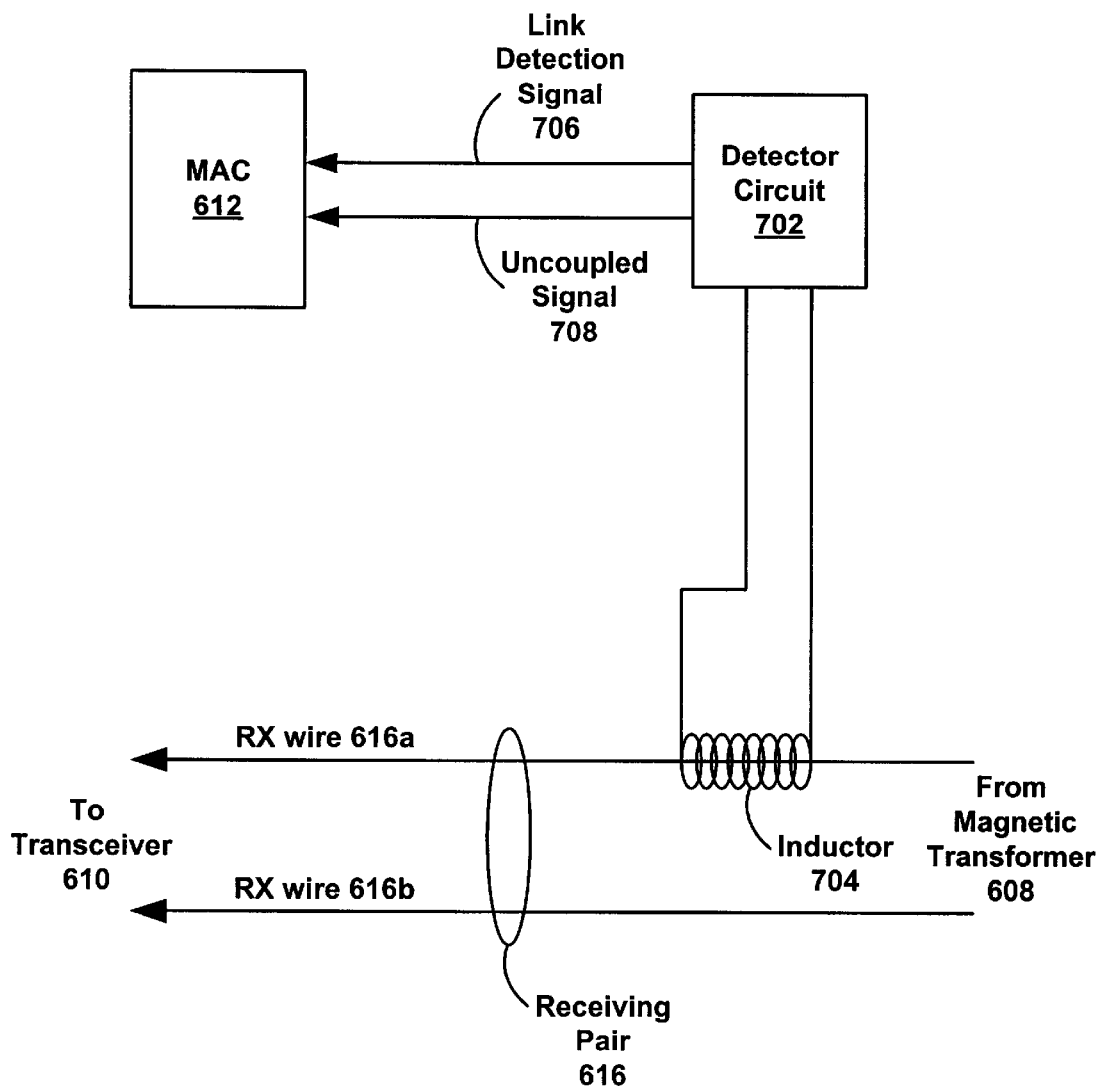
FIG. 7 is a block diagram of one embodiment of a detection system in accordance with the present invention.

With reference to FIG. 7, which is a block diagram of a detection system 700 in accordance with one embodiment of the present invention. The general idea of detection system 700 is to detect whether PC Card 118 is coupled to an active communication link by monitoring its reception of link pulses. That is, if PC Card 118 is not coupled to an active communication link, detection system 700 does not detect the reception of intermittent link pulses by PC Card 118. However, if PC Card 118 is coupled to an active communication link, detection system 700 detects the reception of intermittent link pulses by PC Card 118.

It should be appreciated that once detection system 700 detects that PC Card 118 is coupled to an active communication link, the circuits of PC Card 118 which are within a low power consuming mode (e.g., sleep mode) are activated to enter a high power consuming mode (e.g., active mode). Conversely, once detection system 700 detects that PC Card 118 is not coupled to an active communication link, particular circuits of PC Card 118 which are within the high power consuming mode (e.g., active mode) are caused to enter the low power consuming mode (e.g., sleep mode). Therefore, when PC Card 118 is not coupled to an active communication link, it consumes less power from the power supply of computer system 100. This is especially advantageous when computer system 100 is a battery powered portable laptop computer because it is very important to prolong the life of its batteries as much as possible.

Still referring to FIG. 7, detection system 700 includes a detector circuit 702 which is coupled to an inductor 704 whose coils are wrapped around one of the receiving (RX) wires (e.g., 616a) of receiving pair 616. In this manner, detector circuit 702 utilizes inductor 704 to detect when intermittent link pulses are transmitted from magnetic transformer 608 to transceiver circuit 610 over RX wire 616a. Therefore, when detector circuit 702 detects intermittent link pulses transmitted over RX wire 616a, it transmits a link detection signal 706 (e.g., high voltage) to MAC circuit 612 indicating PC Card 118 is coupled to an active communication link. Furthermore, when detector circuit 702 does not detect intermittent link pulses transmitted over RX wire 616a, it transmits an uncoupled signal 706 (e.g., zero voltage) to MAC circuit 612 indicating PC Card 118 is not coupled to an active communication link.

In response to receiving link detection signal 706, MAC circuit 612 of the present embodiment determines whether any circuits of PC Card 118 are within a low power consuming mode (e.g., sleep mode). If no circuits are within the low power consuming mode, MAC circuit 612 ignores the reception of link detection signal 706. However, if circuits of PC Card 118 are within the low power consuming mode, MAC circuit 612 activates or wakes up those circuits causing them to enter a high power consuming mode (e.g., active mode).

With reference to FIG. 7, in response to receiving uncoupled signal 706, MAC circuit 612 determines whether particular circuits of PC Card 118 are within the low power consuming mode (e.g., sleep mode). If all of the particular circuits are within the low power consuming mode, MAC circuit 612 ignores the reception of uncoupled signal 708. Conversely, if none of the particular circuits are within the low power consuming mode, MAC circuit 612 cause those particular circuits to enter the low power consuming mode (e.g., sleep mode).

It should be appreciated that MAC circuit 612 of the present embodiment is able to cause many different circuits of PC Card 118 to enter and/or exit different power consuming modes under the conditions specifically described above. For example, MAC circuit 612 may cause transceiver circuit 610 to enter and/or exit a high power consuming mode under the conditions described above. Furthermore, MAC circuit 612 may cause transceiver circuit 610 along with portions of its own circuitry to enter and/or exit a low power consuming mode under the conditions described above. Therefore, MAC circuit 612 of the present embodiment is well suited to cause any circuit of PC Card 118 to enter and/or exit different power consuming modes under the conditions described above.

Referring to FIG. 7, it is understood that the coils of inductor 704 are well suited to be wrapped around any receiving wire of PC Card 118 which transmits link pulses. For example, the coils of inductor 704 may be wrapped around a receiving wire of receiving pairs 614 or 618. Additionally, detection system 700 may be implemented as part of printed circuit board 300 or within a particular circuit (e.g., transceiver circuit 610) of PC Card 118. One of the advantages of implementing detection system 700 as part of printed circuit board 300 is that manufactures of PC Cards (e.g., 118) are able to purchase standard circuitry (e.g., transceiver circuits) at the best possible market prices when fabricating PC Cards. As such, manufactures are able to avoid the increased costs of purchasing the custom circuitry of detection system 700 incorporated with standard circuitry.

Figure 8:
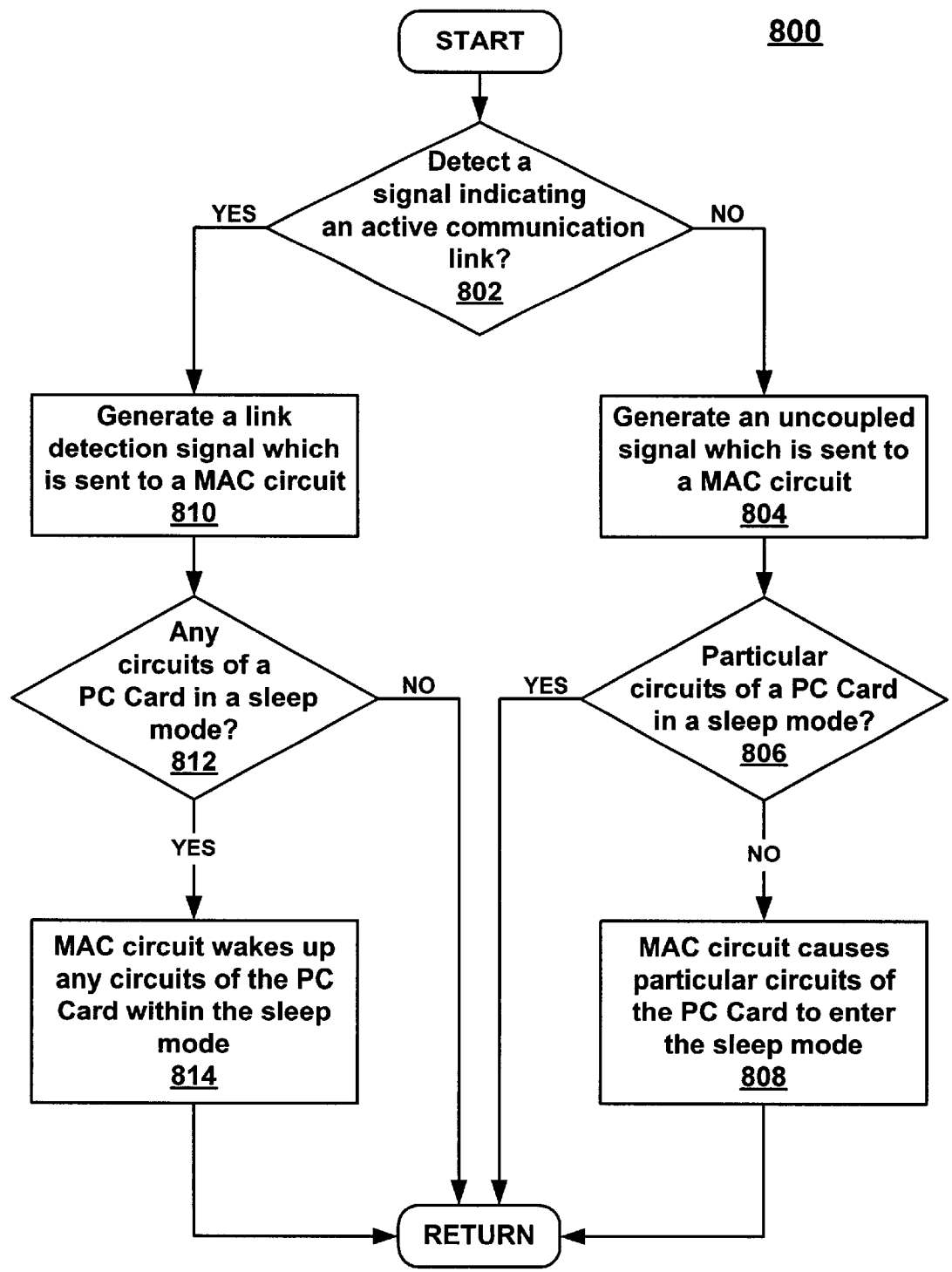
FIG. 8 is a flowchart of steps performed in accordance with one embodiment of the present invention for detecting when a PC Card is coupled to an active communication link.

With reference to FIG. 8, which is a flowchart 800 of steps performed in accordance with one embodiment of the present invention for reducing power consumption by a PC Card coupled to a host computer. Although specific steps are disclosed in flowchart 800, such steps are exemplary. That is, the present embodiment is well suited to performing various other steps or variations of the steps recited in FIG. 8. Within the present embodiment, it should be appreciated that the steps of flowchart 800 can be performed by hardware or software or any combination of hardware and software.

At step 802, the present embodiment detects whether a signal (e.g., link pulse) indicating an active communication link is received by a PC Card. If a signal indicating an active communication link is received by the PC Card, the present embodiment proceeds to step 810. However, if a signal indicating an active communication link is not received by the PC Card, the present embodiment proceeds to step 804.

In step 804, the present embodiment generates an uncoupled signal which is sent to a Medium Access Control (MAC) circuit of the PC Card. It is appreciated that the uncoupled signal of the present embodiment indicates that the PC Card is not coupled to an active communication link.

At step 806 of FIG. 8, the present embodiment determines if particular circuits of the PC Card are within a low power consuming mode (e.g., sleep mode). For example, at step 806, the present embodiment may determine if portions of the MAC circuit and a transceiver circuit of the PC Card are within the low power consuming mode. If the particular circuits of the PC Card are within the low power consuming mode at step 806, the present embodiment exits flowchart 800. However, if the particular circuits of the PC Card are not within the low power consuming mode, the present embodiment proceeds to step 808.

In step 808, the MAC circuit of the present embodiment causes the particular circuits of the PC Card to enter the low power consuming mode (e.g., sleep mode). Upon completing step 808, the present embodiment exits flowchart 800. Therefore, when the PC Card is not coupled to an active communication link, particular circuits of the PC Card enter the low power consuming mode. As such, the PC Card does not consume as much power from a host computer while it is not coupled to an active communication link.

In step 810 of FIG. 8, the present embodiment generates a link detection signal which is sent to the MAC circuit. It is appreciated that the link detection signal of the present embodiment indicates that the PC Card is coupled to an active communication link.

At step 812, the present embodiment determines if any circuits of the PC Card are within a low power consuming mode (e.g., sleep mode). For example, at step 812, the present embodiment may determine if portions of the MAC circuit and the transceiver circuit of the PC Card are within the low power consuming mode. If none of the circuits of the PC Card are within the low power consuming mode at step 812, the present embodiment exits flowchart 800. If any circuits of the PC Card are within the low power consuming mode, the present embodiment proceeds to step 814.

At step 814 of FIG. 8, the MAC circuit of the present embodiment wakes up or activates any circuits of the PC Card within the low power consuming mode causing them to enter a high power consuming mode (e.g., active mode). Upon completing step 814, the present embodiment exits flowchart 800. As such, when PC Card is coupled to an active communication link, its circuits are activated into the high power consuming mode enabling them to perform their desired functionality.

Figure 9:
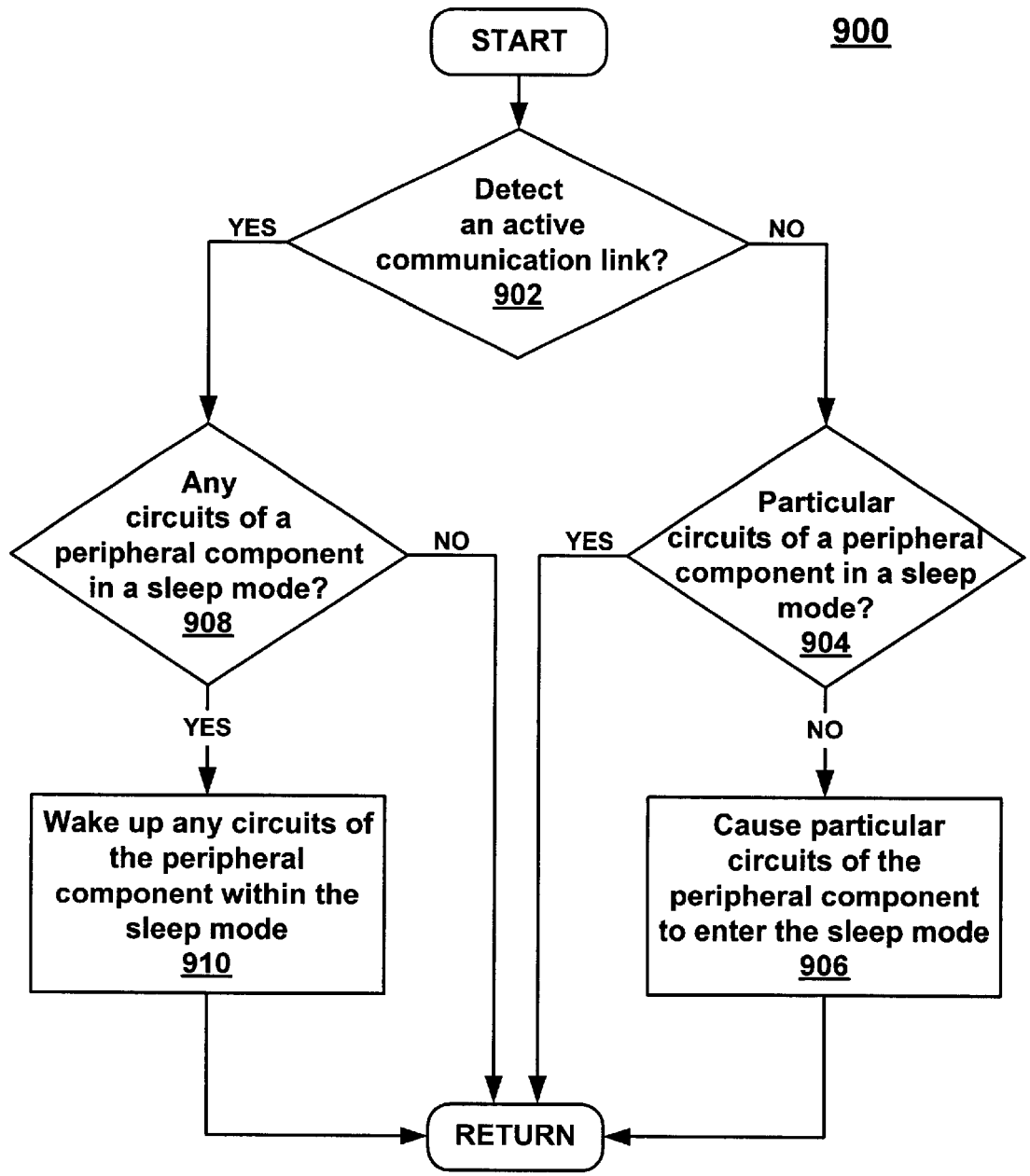
FIG. 9 is a flowchart of steps performed in accordance with one embodiment of the present invention for detecting when a peripheral component is coupled to an active communication link.

Referring now to FIG. 9, which is a flowchart 900 of steps performed in accordance with one embodiment of the present invention for reducing power consumption by a peripheral component coupled to a host computer. Although specific steps are disclosed in flowchart 900, such steps are exemplary. That is, the present embodiment is well suited to performing various other steps or variations of the steps recited in FIG. 9. Within the present embodiment, it should be appreciated that the steps of flowchart 900 can be performed by hardware or software or any combination of hardware and software.

At step 902, the present embodiment detects whether a peripheral component is coupled to an active communication link. If the peripheral component is coupled to an active communication link, the present embodiment proceeds to step 908. Conversely, if the peripheral component is not coupled to an active communication link, the present embodiment proceeds to step 904.

In step 904, the present embodiment determines if particular circuits of the peripheral component are within a low power consuming mode (e.g., sleep mode). For example, at step 906, the present embodiment may determine if portions of a MAC circuit and a transceiver circuit of the peripheral component are within the low power consuming mode. If the particular circuits of the peripheral component are within the low power consuming mode at step 904, the present embodiment exits flowchart 900. If the particular circuits of the peripheral component are not within the low power consuming mode, the present embodiment proceeds to step 906.

At step 906 of FIG. 9, the present embodiment causes the particular circuits of the peripheral component to enter the low power consuming mode (e.g., sleep mode). Upon completing step 906, the present embodiment exits flowchart 900. In this manner, when the peripheral component is not coupled to an active communication link, particular circuits of the peripheral component enter the low power consuming mode. As such, the peripheral component does not consume as much power from a host computer while it is not coupled to an active communication link.

In step 908, the present embodiment determines if any circuits of the peripheral component are within a low power consuming mode (e.g., sleep mode). For example, at step 908, the present embodiment may determine if portions of the MAC circuit and the transceiver circuit of the peripheral component are within the low power consuming mode. If none of the circuits of the peripheral component are within the low power consuming mode at step 908, the present embodiment exits flowchart 900. If any circuits of the peripheral component are within the low power consuming mode, the present embodiment proceeds to step 910.

At step 910 of FIG. 9, the present embodiment activates or wakes up any circuits of the peripheral component within the low power consuming mode causing them to enter a high power consuming mode (e.g., active mode). Upon completing step 910, the present embodiment exits flowchart 900. As such, when the peripheral component is coupled to an active communication link, its circuits are activated into the high power consuming mode enabling them to perform their desired functionality.

Accordingly, the present invention provides a method and system for reducing power usage of a communication expansion board or card (e.g., PC Card) thereby prolonging the battery life of a portable laptop computer.

The foregoing descriptions of specific embodiments of the present invention have been presented for purposes of illustration and description. They are not intended to be exhaustive or to limit the invention to the precise forms disclosed, and obviously many modifications and variations are possible in light of the above teaching. The embodiments were chosen and described in order to best explain the principles of the invention and its practical application, to thereby enable others skilled in the art to best utilize the invention and various embodiments with various modifications as are suited to the particular use contemplated. It is intended that the scope of the invention be defined by the claims appended hereto and their equivalents.

What is claimed is:

1. A method for reducing power consumption by a peripheral component coupled to a host computer, said method comprising the steps of:
   (a) detecting whether a peripheral component is coupled to an active communication link;
   (b) determining whether a circuit of said peripheral component is within a first power consuming mode; and
   (c) provided said peripheral component is not coupled to said active communication link and said circuit of said peripheral component is within said first power consuming mode, causing said circuit to enter a second power consuming mode.

2. The method for reducing power consumption by a peripheral component coupled to a host computer as described in claim 1 further comprising the step of:

(d) provided said peripheral component is coupled to said active communication link and said circuit of said peripheral component is not within said first power consuming mode, causing said circuit to enter said first power consuming mode.

3. The method for reducing power consumption by a peripheral component coupled to a host computer as described in claim 1 wherein said step (c) comprises:

provided said peripheral component is not coupled to said active communication link and said circuit of said peripheral component is within said first power consuming mode, causing said circuit to enter said second power consuming mode, wherein said first power consuming mode comprises a high power consuming mode and said second power consuming mode comprises a low power consuming mode.

4. The method for reducing power consumption by a peripheral component coupled to a host computer as described in claim 1 wherein said step (a) comprises:

detecting whether said peripheral component is coupled to said active communication link, wherein said peripheral component comprises a PC Card.

5. The method for reducing power consumption by a peripheral component coupled to a host computer as described in claim 1 wherein said step (a) comprises:

detecting whether said peripheral component is coupled to said active communication link, wherein said peripheral component comprises a network interface card (NIC).

6. The method for reducing power consumption by a peripheral component coupled to a host computer as described in claim 1 wherein said step (b) comprises:

determining whether said circuit of said peripheral component is within said first power consuming mode, wherein said circuit comprises part of a transceiver circuit.

7. The method for reducing power consumption by a peripheral component coupled to a host computer as described in claim 1 wherein said step (b) comprises:

determining whether said circuit of said peripheral component is within said first power consuming mode, wherein said circuit comprises part of a medium access control (MAC) circuit.

8. A method for reducing power consumption by a peripheral component coupled to a host computer, said method comprising the steps of:

(a) detecting whether a peripheral component is coupled to an active communication link, said peripheral component coupled to a host computer;

(b) determining whether a circuit of said peripheral component is within a first power consuming mode; and (c) provided said peripheral component is coupled to said active communication link and said circuit of said peripheral component is within said first power consuming mode, causing said circuit to enter a second power consuming mode.

9. The method for reducing power consumption by a peripheral component coupled to a host computer as described in claim 8 further comprising the step of:

(d) provided said peripheral component is not coupled to said active communication link and said circuit of said peripheral component is within said second power consuming mode, causing said circuit to enter said first power consuming mode.

10. The method for reducing power consumption by a peripheral component coupled to a host computer as described in claim 8 wherein said step (c) comprises:

provided said peripheral component is not coupled to said active communication link and said circuit of said peripheral component is within said first power consuming mode, causing said circuit to enter said second power consuming mode, wherein said first power consuming mode comprises a low power consuming mode and said second power consuming mode comprises a high power consuming mode.

11. The method for reducing power consumption by a peripheral component coupled to a host computer as described in claim 8 wherein said step (a) comprises:

detecting whether said peripheral component is coupled to said active communication link, wherein said peripheral component comprises a PC Card.

12. The method for reducing power consumption by a peripheral component coupled to a host computer as described in claim 8 wherein said step (a) comprises:

detecting whether said peripheral component is coupled to said active communication link, wherein said peripheral component comprises a network interface card (NIC).

13. The method for reducing power consumption by a peripheral component coupled to a host computer as described in claim 8 wherein said step (b) comprises:

determining whether said circuit of said peripheral component is within said first power consuming mode, wherein said circuit comprises part of a transceiver circuit.

14. The method for reducing power consumption by a peripheral component coupled to a host computer as described in claim 8 wherein said step (b) comprises:

determining whether said circuit of said peripheral component is within said first power consuming mode, wherein said circuit comprises part of a medium access control (MAC) circuit.

15. A system for reducing power consumption by a peripheral component coupled to a host computer, said system comprises:

a detector circuit coupled to a peripheral component and adapted to detect whether said peripheral component is coupled to an active communication link, said detector circuit adapted to generate a first signal in response to said peripheral component not being coupled to said active communication link;

a control circuit coupled to receive said first signal from said detector circuit and adapted to determine whether a circuit of said peripheral component is within a first power consuming mode; and in response to receiving said first signal and said circuit of said peripheral component being within said first power consuming mode, said control circuit adapted to cause said circuit to enter a second power mode.

16. The system as described in claim 15 wherein said detector circuit is adapted to generate a second signal when said peripheral component is coupled to an active communication link.

17. The system as described in claim 16 wherein said control circuit is coupled to receive said second signal from said detector circuit; and in response to receiving said second signal and said circuit of said peripheral component not being within said first power consuming mode, said control circuit is adapted to cause said circuit to enter said first power consuming mode.

18. The system as described in claim 15 wherein said first power consuming mode comprises a high power consuming mode; and said second power consuming mode comprises a low power consuming mode.

19. The system as described in claim 15 wherein said peripheral component comprises a PC Card.

20. The system as described in claim 15 wherein said peripheral component comprises a network interface card (NIC).

21. The system as described in claim 15 wherein said circuit is part of a transceiver circuit.

22. The system as described in claim 15 wherein said circuit is part of said control circuit.

23. The system as described in claim 15 wherein said control circuit comprises a medium access control (MAC) circuit.

24. The system as described in claim 15 wherein said detector circuit utilizes an inductor.

* * * * *